(12) United States Patent
White et al.

(10) Patent No.: US 8,072,908 B2
(45) Date of Patent: Dec. 6, 2011

(54) PARTITIONED FORWARDING OF PACKETS ORIGINATED ON A BROADCAST LINK AMONG LAYER 2 FORWARDING DEVICES OF DIFFERENT ADJACENCY NETWORKS

(75) Inventors: Russell I. White, Holly Springs, NC (US); Ian Michael Charles Shand, Surry (GB); Alvaro Enrique Retana, Raleigh, NC (US)

(73) Assignee: Cisco Technology, Inc., San Jose, CA (US)

( * ) Notice: Subject to any disclaimer, the term of this patent is extended or adjusted under 35 U.S.C. 154(b) by 261 days.

(21) Appl. No.: 12/509,587

(22) Filed: Jul. 27, 2009

(65) Prior Publication Data

US 2011/0019671 A1    Jan. 27, 2011

(51) Int. Cl.
*H04L 12/28* (2006.01)
(52) U.S. Cl. .................... 370/255; 370/351; 370/401
(58) Field of Classification Search ................ None
See application file for complete search history.

(56) References Cited

U.S. PATENT DOCUMENTS

| | | | | |
|---|---|---|---|---|
| 5,323,394 A * | 6/1994 | Perlman | | 370/238 |
| 6,236,659 B1 * | 5/2001 | Pascoe | | 370/404 |
| 6,567,410 B1 * | 5/2003 | Perlman | | 370/401 |
| 2003/0231629 A1 * | 12/2003 | Banerjee et al. | | 370/390 |
| 2003/0235158 A1 * | 12/2003 | Lee et al. | | 370/256 |
| 2007/0206513 A1 * | 9/2007 | Cho et al. | | 370/254 |
| 2008/0186965 A1 * | 8/2008 | Zheng et al. | | 370/389 |

OTHER PUBLICATIONS

Perlaman et al., "Rbridges: Base Protocol Specification," draft-ietf-trill-rbridge-protocol-08.txt, Internet Society, Jul. 14, 2008 (79 pages).
Perlaman et al., "Rbridges: Base Protocol Specification," draft-ietf-trill-rbridge-protocol-13.txt, Internet Society, Jun. 26, 2009 (102 pages).
Radia Perlman, "Rbridges: Transparent Routing," IEEE INFOCOM 2004, Institute of Electrical and Electronics Engineers (IEEE), Mar. 2004 (8 pages).

* cited by examiner

*Primary Examiner* — Hong Cho
(74) *Attorney, Agent, or Firm* — The Law Office of Kirk D. Williams

(57) ABSTRACT

The designated forwarding device functionality for forwarding of packets originated on a broadcast link among layer 2 is shared among multiple forwarding devices of different adjacency networks. As these networks do not form adjacencies, the forwarding devices do not natively participate in a same spanning tree for determining how to forward packets, and a designated forwarding device is used for forwarding packets originated on the common broadcast link. Distributing the role of a designated forwarding device among multiple of the forwarding devices provides a means for more efficiently forwarding packets to their destinations.

24 Claims, 4 Drawing Sheets

PARTITIONED FORWARDING OF PACKETS ORIGINATED ON A BROADCAST LINK AMONG LAYER 2 FORWARDING DEVICES OF DIFFERENT ADJACENCY NETWORKS

TECHNICAL FIELD

The present disclosure relates generally to communications and computer systems, especially layer 2 forwarding devices, routers, other packet switching systems, and other network devices.

BACKGROUND

The communications industry is rapidly changing to adjust to emerging technologies and ever increasing customer demand. This customer demand for new applications and increased performance of existing applications is driving communications network and system providers to employ networks and systems having greater speed and capacity (e.g., greater bandwidth). In trying to achieve these goals, a common approach taken by many communications providers is to use packet switching technology. Note, nothing described or referenced in this document is admitted as prior art to this application unless explicitly so stated.

Many current layer 2 (L2) networks, including those based on 802.1aq and TRILL, use a broadcast edge/routed cloud paradigm to replace spanning tree with a link state, shortest path mechanism for forwarding layer 2 traffic between attached devices or subnetworks. Among multiple L2 edge devices attached to a broadcast link, a single L2 forwarding device is selected to forward traffic originated on the broadcast link, and the others are configured to ignore such traffic. This selected device is referred to as the "designated forwarding device." In TRILL, these forwarding devices are referred to as Rbridges (routing bridges), and the designated forwarding device is referred to as the "elected Rbridge."

BRIEF DESCRIPTION OF THE DRAWINGS

The appended claims set forth the features of the invention with particularity. The invention, together with its advantages, may be best understood from the following detailed description taken in conjunction with the accompanying drawings of which:

DESCRIPTION OF EXAMPLE EMBODIMENTS

1. Overview

Figure 1:
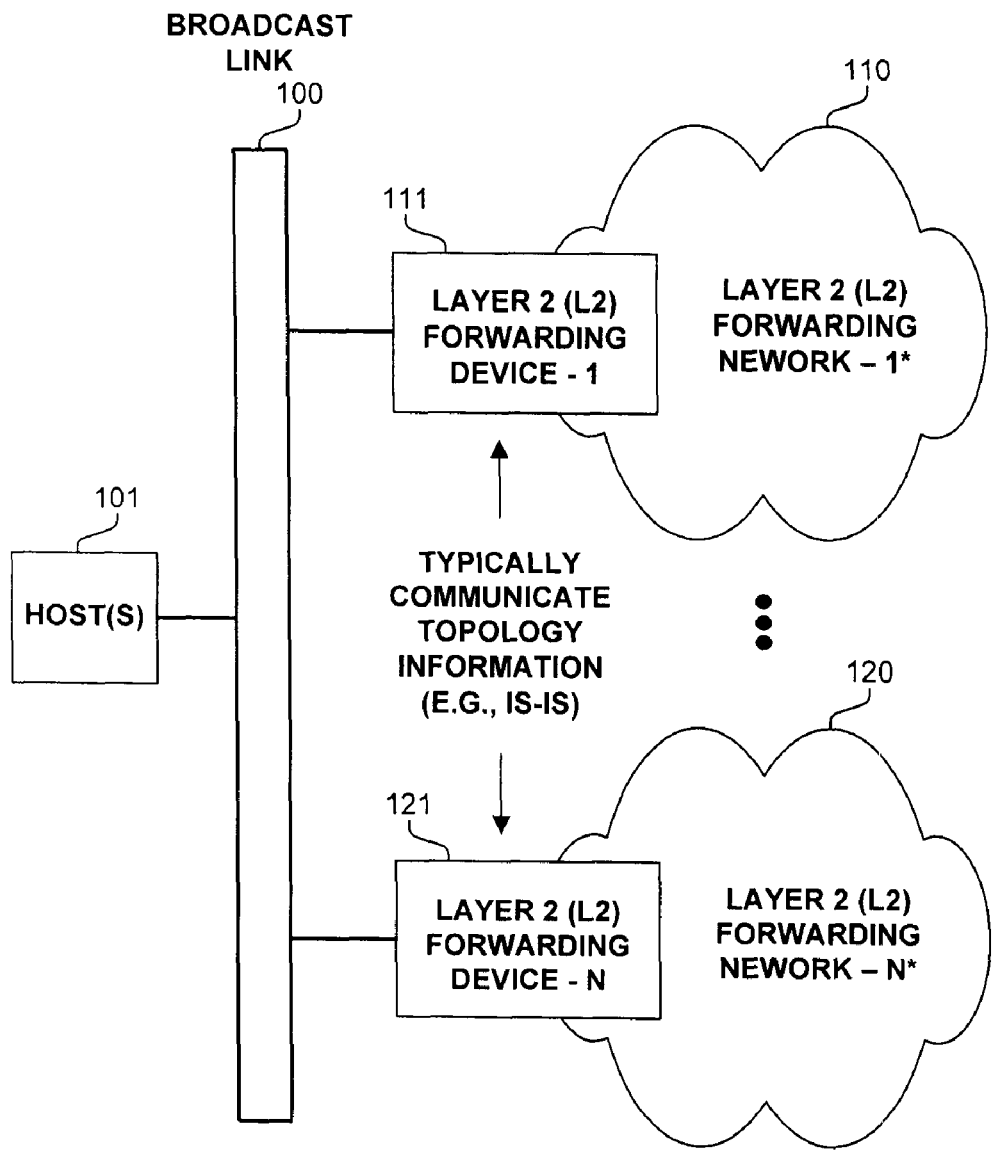
FIG. 1 illustrates a network operating according to one embodiment.

Disclosed are, inter alia, methods, apparatus, computer-storage media, mechanisms, and means associated with partitioned forwarding of packets originated on a broadcast link among layer 2 forwarding devices of different forwarding adjacency networks. As these networks do not form forwarding adjacencies, the forwarding devices do not natively participate in a same spanning tree for determining how to forward packets, and a designated forwarding device is used for forwarding packets originated on the common broadcast link. Distributing the role of a designated forwarding device among multiple of these forwarding devices provides a means for more efficiently forwarding packets to their destinations. Typically, the space of packets originated on the broadcast link to be forwarded is partitioned among these multiple forwarding devices according to topology information shared among these multiple devices, such as via a routing protocol. In one embodiment, each of these forwarding devices calculates a spanning tree rooted at a pseudo node attached to these multiple forwarding devices for a network including all of their networks. From there, each of these multiple forwarding devices deterministically determines the partition of the forwarding space that it should forward packets, such as based on least cost, typically with tie-breakers such that each forwarding device independently determines a non-overlapping partition, and the entire space is covered by these partitions. In one embodiment, each forwarding device determines the spanning tree for each of these forwarding devices and their networks, and then deterministically selects the partitioning therefrom.

2. Description

Embodiments described herein include various elements and limitations, with no one element or limitation contemplated as being a critical element or limitation. Each of the claims individually recites an aspect of the invention in its entirety. Moreover, some embodiments described may include, but are not limited to, inter alia, systems, networks, integrated circuit chips, embedded processors, ASICs, methods, and computer-readable media containing instructions. The embodiments described hereinafter embody various aspects and configurations within the scope and spirit of the invention, with the figures illustrating exemplary and non-limiting configurations. Note, computer-readable media and means for performing methods and processing block operations (e.g., a processor and memory or other apparatus configured to perform such operations) are disclosed and are in keeping with the extensible scope and spirit of the invention. Note, the term "apparatus" is used consistently herein with its common definition of an appliance or device.

Note, the steps, connections, and processing of signals and information illustrated in the figures, including, but not limited to any block and flow diagrams and message sequence charts, may typically be performed in the same or in a different serial or parallel ordering and/or by different components and/or processes, threads, etc., and/or over different connections and be combined with other functions in other embodiments, unless this disables the embodiment or a sequence is explicitly or implicitly required (e.g., for a sequence of read the value, process said read value—the value must be obtained prior to processing it, although some of the associated processing may be performed prior to, concurrently with, and/or after the read operation).

The term "one embodiment" is used herein to reference a particular embodiment, wherein each reference to "one embodiment" may refer to a different embodiment, and the use of the term repeatedly herein in describing associated features, elements and/or limitations does not establish a cumulative set of associated features, elements and/or limitations that each and every embodiment must include, although any embodiment may include some, all or none of the features, elements and/or limitations described in relation to a particular different one embodiment. In addition, the terms "first," "second," etc. are typically used herein to denote different units (e.g., a first element, a second element). The use of these terms herein does not necessarily connote an ordering such as one unit or event occurring or coming before another, but rather provides a mechanism to distinguish between particular units. Moreover, the phrases "based on x" and "in response to x" are used to indicate a minimum set of items "x" from which something is derived or caused, wherein "x" is extensible and does not necessarily describe a complete list of items on which the operation is performed, etc. Additionally, the phrase "coupled to" is used to indicate some level of direct or indirect connection between two elements or devices, with the coupling device or devices modifying or not modifying the coupled signal or communicated information. Moreover, the term "or" is used herein to identify a selection of one or more, including all, of the conjunctive items. Additionally, the transitional term "comprising," which is synonymous with "including," "containing," or "characterized by," is inclusive or open-ended and does not exclude additional, unrecited elements or method steps. Note, nothing described or referenced in this document is admitted as prior art to this application unless explicitly so stated. Finally, the term "particular machine," when recited in a method claim for performing steps, refers to a particular machine within the 35 USC §101 machine statutory class.

Disclosed are, inter alia, methods, apparatus, computer-storage media, mechanisms, and means associated with partitioned forwarding of packets originated on a broadcast link among layer 2 forwarding devices of different forwarding adjacency networks. As these networks do not form forwarding adjacencies, the forwarding devices do not natively participate in a same spanning tree for determining how to forward packets, and a designated forwarding device is used for forwarding packets originated on the common broadcast link. Distributing the role of a designated forwarding device among multiple of these forwarding devices provides a means for more efficiently forwarding packets to their destinations. Typically, the space of packets originated on the broadcast link to be forwarded is partitioned among these multiple forwarding devices according to topology information shared among these multiple devices, such as via a routing protocol. In one embodiment, each of these forwarding devices calculates a spanning tree rooted at a pseudo node attached to these multiple forwarding devices for a network including all of their networks. From there, each of these multiple forwarding devices deterministically determines the partition of the forwarding space that it should forward packets, such as based on least cost, typically with tie-breakers such that each forwarding device independently determines a non-overlapping partition, and the entire space is covered by these partitions. In one embodiment, each forwarding device determines the spanning tree for each of these forwarding devices and their networks, and then deterministically selects the partitioning therefrom.

One embodiment includes an apparatus, comprising: a first layer 2 (L2) forwarding device of a first L2 forwarding network configured for communicatively coupling to a broadcast link for receiving packets being sent to the first L2 forwarding network and one or more second L2 forwarding networks not having L2 forwarding adjacency for forwarding packets with the first L2 forwarding network; wherein the first L2 forwarding device is configured: to determine a partition of some, but less than all, of the forwarding space of packets originated on the broadcast link by devices other than one or more second L2 forwarding devices of said second L2 forwarding networks; and to forward, according to said determined partition, some, but less than all, of said packets originated on the broadcast link by devices other than said second L2 forwarding devices.

In one embodiment, said determining the partitioning includes determining a spanning tree for a network comprising the first and said second L2 forwarding networks; and selecting the partitioning based on said determined spanning tree. In one embodiment, said determined the spanning tree includes calculating the spanning tree rooted a pseudo node attached to the first and said second L2 forwarding devices. In one embodiment, said determining the partitioning includes determining a spanning tree for at least one of said second L2 forwarding networks; and selecting the partitioning based on said determined spanning tree. In one embodiment, said determining the partitioning includes determining a spanning tree for each one of said second L2 forwarding networks; and selecting the partitioning based on said determined spanning trees of said second L2 forwarding networks.

In one embodiment, each of said first and second L2 forwarding devices is a Rbridge (routing bridge). In one embodiment, a particular one of said second L2 forwarding devices is the elected Designated Rbridge (DR) for the broadcast link. In one embodiment, the first L2 forwarding device is the elected Designated Rbridge (DR) for the broadcast link and is configured to forward said some, but less than all, of the packets in contravention of its DR status. In one embodiment, each of said first and second L2 forwarding devices is a Rbridge that communicates topology information using Intermediate System to Intermediate System (IS-IS) protocol.

In one embodiment, said first L2 forwarding device is configured to running spanning tree protocol for the first L2 forwarding network. In one embodiment, a particular one of said second L2 forwarding devices is the designated forwarding device for the broadcast link. In one embodiment, the first L2 forwarding device is the designated forwarding device for the broadcast link and is configured to forward said some, but less than all, of the packets in contravention of its designated forwarding device status. In one embodiment, a particular one of said one or more second L2 forwarding devices is a designated forwarding device (DFD); wherein the designated forwarding device is an L2 forwarding device selected to forward all packets transmitted to the broadcast segment other than by the particular one of said second L2 forwarding devices.

One embodiment includes a method, comprising: employing a first layer 2 (L2) forwarding device of a first L2 forwarding network to perform operations; wherein the first layer 2 (L2) forwarding device is communicatively coupled to a broadcast link for receiving packets being sent to the first L2 forwarding network and one or more second L2 forwarding networks not having L2 forwarding adjacency for forwarding packets with the first L2 forwarding network; and wherein said operations include: determining, by the first L2 forwarding device, a partition of some, but less than all, of the forwarding space of packets originated on the broadcast link by devices other than one or more second L2 forwarding devices of said second L2 forwarding networks; and forwarding, by the first L2 forwarding device according to said determined partition, some, but less than all, of said received packets that were originated on the broadcast link by devices other than said second L2 forwarding devices.

In one embodiment, said determining the partitioning includes determining a spanning tree for a network comprising the first and said one or more second L2 forwarding networks, with the spanning tree rooted at a pseudo node attached to the first and said one or more second L2 forwarding devices; and selecting the partitioning based on said determined spanning tree. In one embodiment, a particular one of said one or more second L2 forwarding devices is a designated forwarding device (DFD); wherein the designated forwarding device is an L2 forwarding device selected to forward all packets transmitted to the broadcast segment other than by the particular one of said one or more second L2 forwarding devices. In one embodiment, said determining the partitioning includes determining a spanning tree for each of one of said one or more second L2 forwarding networks; and selecting the partitioning based on said determined spanning tree for each of one of said one or more second L2 forwarding networks.

One embodiment includes an apparatus, comprising: a first layer 2 (L2) forwarding device of a first L2 forwarding network configured for communicatively coupling to a broadcast link for receiving packets being sent to the first L2 forwarding network and one or more second L2 forwarding networks not having L2 forwarding adjacency for forwarding packets with the first L2 forwarding network; wherein the first L2 forwarding device includes: means for determining, by the first L2 forwarding device, a partition of some, but less than all, of the forwarding space of packets originated on the broadcast link by devices other than one or more second L2 forwarding devices of said second L2 forwarding networks; and means for forwarding, by the first L2 forwarding device according to said determined partition, some, but less than all, of said received packets that were originated on the broadcast link by devices other than said second L2 forwarding devices.

In one embodiment, a particular one of said one or more second L2 forwarding devices is the elected Designated Rbridge (DR) for the broadcast link. In one embodiment, the first L2 forwarding device is the elected Designated Rbridge (DR) for the broadcast link configured to forward said some, but less than all, of the packets in contravention of its DR status.

Expressly turning to the figures, FIG. 1 illustrates a network operating according to one embodiment. Shown are N networks 110, 120, with N being an integer greater than one. The edges of networks 110 and 120 are communicatively coupled to a broadcast link 100 via layer 2 (L2) forwarding devices 111 and 121, respectively. N networks 110, 120, do not form a forwarding adjacency (i.e., they do not form a single spanning tree for determining how to forward packets). In order for packets originated on broadcast link 100 from a host device, such as host device 101, a "designated forwarding device" technique is used, wherein the designated forwarding device functionality is distributed among the L2 forwarding devices (111, 121) directly attached to broadcast link 100. Note, as used herein, a broadcast link (e.g., broadcast link 100) is not limited to a single broadcast medium, but can include multiple bridges, hubs, etc. forming the broadcast link.

In one embodiment, each of L2 forwarding devices (111, 121) determines its respective partition of the packet space based on topology information of networks 110, 120, typically shared via a routing protocol, such as, but not limited to Intermediate System to Intermediate System (IS-IS) routing protocol. In one embodiment, each of L2 forwarding devices 111 and 121 determines a spanning tree for a single network comprising N networks 110, 120. In one embodiment, each of L2 forwarding devices 111 and 121 calculates this spanning tree rooted at a pseudo node attached to each of L2 forwarding devices 111 and 121 at a same cost. Based thereon, each of L2 forwarding devices 111, 121 selects its respective portion of the space of packets, originated on broadcast link 100, to forward. In one embodiment, each of L2 forwarding devices 111, 121 determines a spanning tree for each of L2 forwarding networks 110, 120, and determines its partitioning therefrom.

It is desirable that each of the partitions of these L2 forwarding devices 111, 121 do not overlap in order to avoid multiple L2 forwarding devices 111, 121 forwarding a same packet. In the case of an equal forwarding cost to a destination for multiple L2 forwarding devices 111, 121, a deterministic tie breaking mechanism is used, such as, but not limited to, based on addresses or other characteristics of L2 forwarding devices 111, 121 and/or L2 forwarding networks 110, 120 or devices therein. For example, one embodiment chooses the eligible forwarder that is the designated router or designated intermediate system. One embodiment chooses the eligible forwarder based on the lower or higher system ID, local interface address, or some other commonly shared piece of information. One embodiment chooses the eligible forwarder based on a pre-agreed and well known hash algorithm which splits the traffic along the available equal cost paths.

Figure 2:
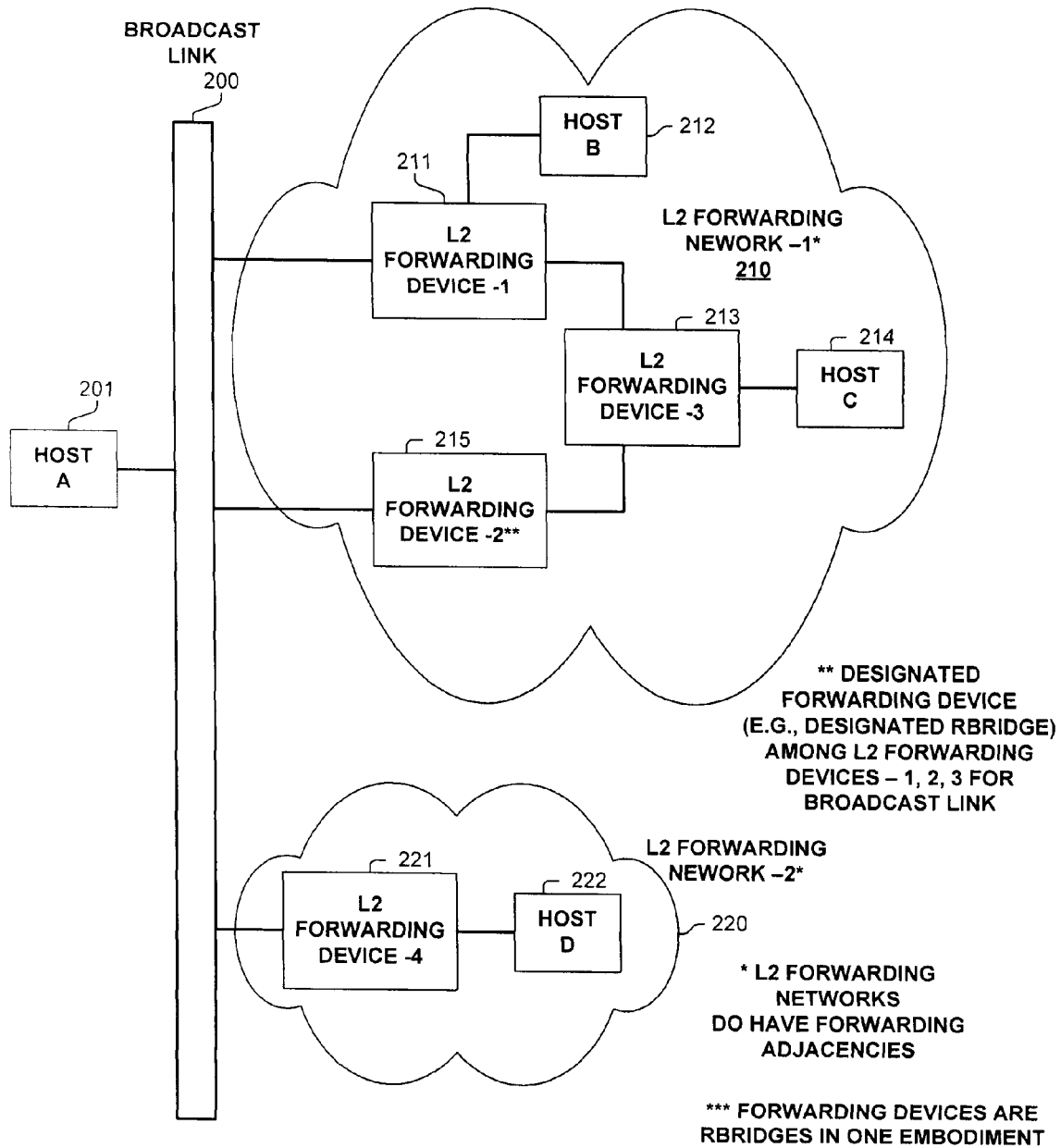
FIG. 2 illustrates a network operating according to one embodiment.

An operating example may help to better understand the operation of one embodiment. Shown in FIG. 2 are two different adjacency networks 210 and 220, whose edges are communicatively coupled to broadcast link 200 via L2 forwarding devices 211, 215 and 221.

In prior approaches, a single one of L2 forwarding devices 211, 215 and 221 would be the "designated forwarding device" and would be the only device allowed to take native L2 packets off of broadcast link 200. In such configuration where L2 forwarding device 215 is the designated forwarding device, host A 201 could not communicate with host D 222. In a network operating according to TRILL, one of L2 forwarding devices (Rbridges) 211, 215 and 221 would be elected as the "designated Rbridge" and would be the only device allowed to take native L2 packets off of broadcast link 200. In such a scenario, a packet sent from host A 201 to host D 222 would be placed on broadcast link 200, picked up by L2 forwarding device 215, encapsulated and sent to L2 forwarding device 221, the encapsulation removed reforming the native L2 packet, which is sent to host D 222.

In one embodiment, the functionality of the "designated forwarding device" is split among multiple L2 forwarding devices 211, 215 and 221, for efficiently forwarding packets. According to an example configuration of one embodiment and for packet being sent from host A 201: L2 forwarding device 211 would be the designated forwarding device for packets being sent to host B 212; L2 forwarding device 215 would be the designated forwarding device for packets being sent to host C 214; and L2 forwarding device 221 would be the designated forwarding device for packets being sent to host D 222.

Figure 3:
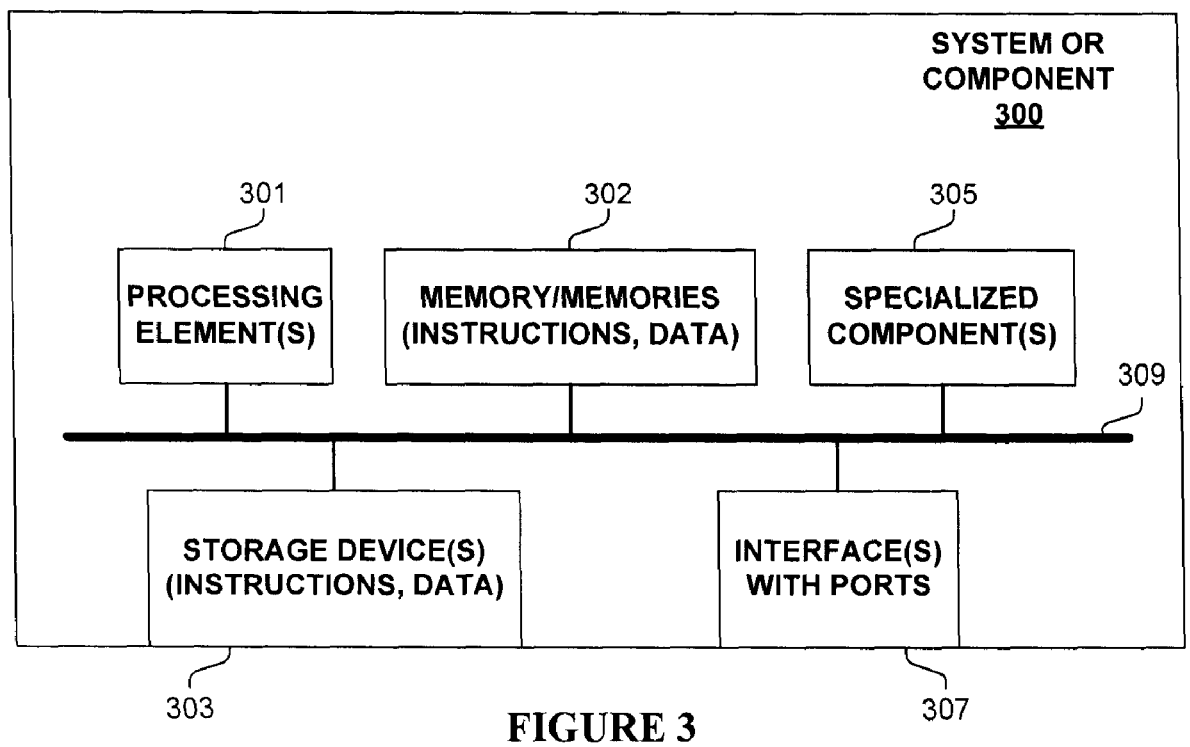
FIG. 3 illustrates an example system or component used in one embodiment.

FIG. 3 is block diagram of a system or component 300 used in one embodiment associated with partitioned forwarding of packets originated on a broadcast link among layer 2 forwarding devices of different forwarding adjacency networks. In one embodiment, system or component 300 performs one or more processes corresponding to one of the flow diagrams illustrated or otherwise described herein.

In one embodiment, system or component 300 includes one or more processing elements 301, memory 302, storage device(s) 303, specialized component(s) 305 (e.g. optimized hardware such as for performing operations, etc.), and interface(s) 307 for communicating information (e.g., sending and receiving packets, user-interfaces, displaying information, etc.), which are typically communicatively coupled via one or more communications mechanisms 309, with the communications paths typically tailored to meet the needs of the application. In one embodiment system or component 300 corresponds to, or is part of, one or more of L2 forwarding devices 111 and 121 of FIG. 1, and/or corresponds to, or is part of, one or more of L2 forwarding devices 211, 215 and 221 of FIG. 2.

Various embodiments of component 300 may include more or less elements. The operation of component 300 is typically controlled by processing element(s) 301 using memory 302 and storage device(s) 303 to perform one or more tasks or processes. Memory 302 is one type of computer-readable/ computer-storage medium, and typically comprises random access memory (RAM), read only memory (ROM), flash memory, integrated circuits, and/or other memory components. Memory 302 typically stores computer-executable instructions to be executed by processing element(s) 301 and/or data which is manipulated by processing element(s) 301 for implementing functionality in accordance with an embodiment. Storage device(s) 303 are another type of computer-readable medium, and typically comprise solid state storage media, disk drives, diskettes, networked services, tape drives, and other storage devices. Storage device(s) 303 typically store computer-executable instructions to be executed by processing element(s) 301 and/or data which is manipulated by processing element(s) 301 for implementing functionality in accordance with an embodiment.

Figure 4:
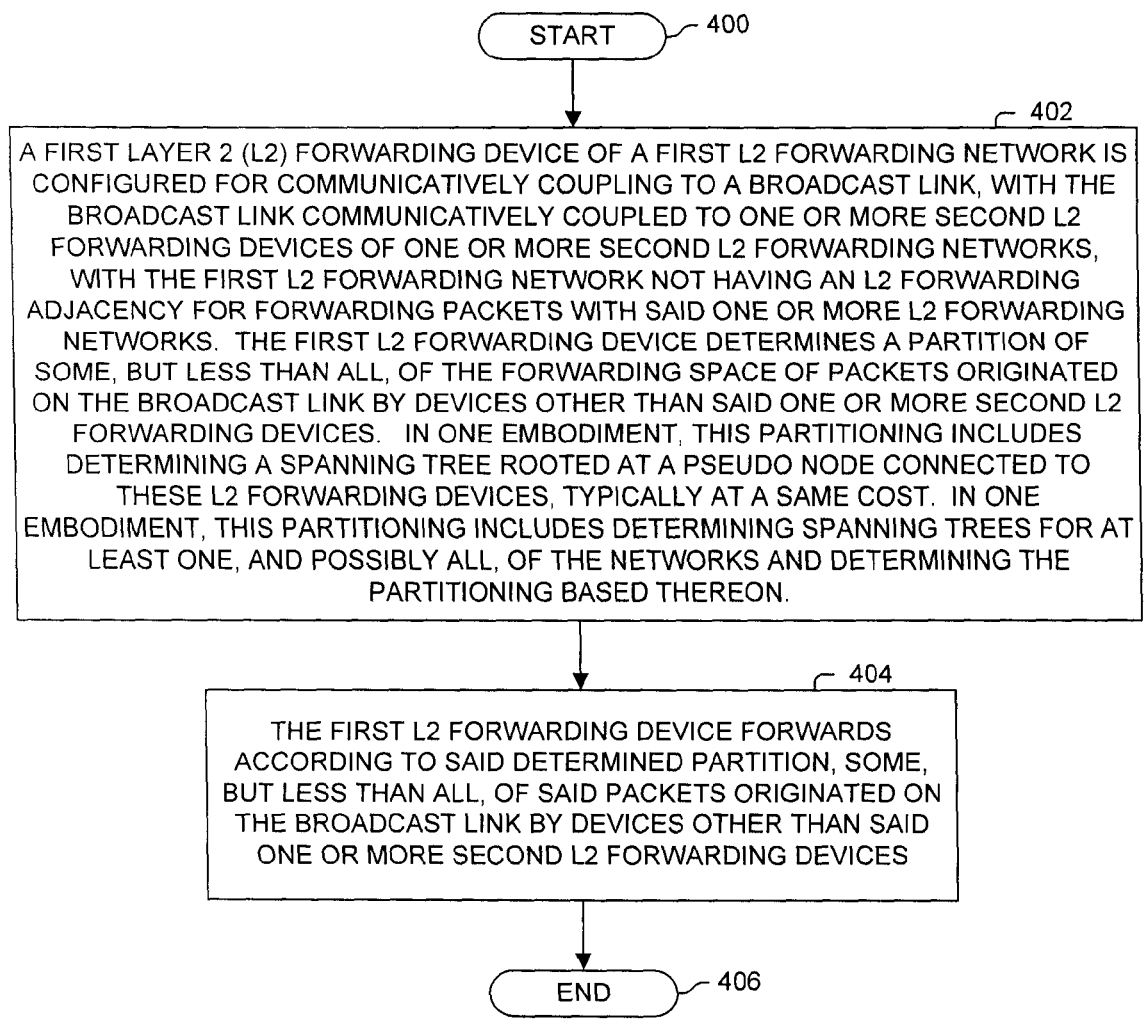
FIG. 4 illustrates a process performed in one embodiment.

FIG. 4 illustrates a process performed in one embodiment. Processing begins with process block 400. As described in process block 402, a first layer 2 (L2) forwarding device of a first L2 forwarding network configured for communicatively coupling to a broadcast link, with the broadcast link communicatively coupled to one or more second L2 forwarding devices of one or more second L2 forwarding networks, with the first L2 forwarding network not having an L2 forwarding adjacency for forwarding packets with said one or more L2 forwarding networks. The first L2 forwarding device determines a partition of some, but less than all, of the forwarding space of packets originated on the broadcast link by devices other than said one or more second L2 forwarding devices. In one embodiment, this partitioning includes determining a spanning tree rooted at a pseudo node attached to these L2 forwarding devices, typically at a same cost. In one embodiment, this partitioning includes determining spanning trees for at least one, and possibly all, of the networks and determining the partitioning based thereon. In process block 404, the first L2 forwarding device forwards according to said determined partition, some, but less than all, of said packets originated on the broadcast link by devices other than said one or more second L2 forwarding devices. Processing of the flow diagram illustrated in FIG. 4 is complete, as indicated by process block 406.

In view of the many possible embodiments to which the principles of our invention may be applied, it will be appreciated that the embodiments and aspects thereof described herein with respect to the drawings/figures are only illustrative and should not be taken as limiting the scope of the invention. For example, and as would be apparent to one skilled in the art, many of the process block operations can be re-ordered to be performed before, after, or substantially concurrent with other operations. Also, many different forms of data structures could be used in various embodiments. The invention as described herein contemplates all such embodiments as may come within the scope of the following claims and equivalents thereof.

What is claimed is:

1. An apparatus, comprising:
   a first layer 2 (L2) forwarding device of a first L2 forwarding network, wherein the first L2 forwarding device is configured:
   for communicatively coupling to a broadcast link for receiving packets being sent to the first L2 forwarding network and one or more second L2 forwarding networks not having L2 forwarding adjacency for forwarding packets with the first L2 forwarding network;
   to determine a partition of some, but less than all, of the forwarding space of packets originated on the broadcast link by devices other than one or more second L2 forwarding devices of said second L2 forwarding networks; and
   to forward, according to said determined partition, some, but less than all, of said packets originated on the broadcast link by devices other than said second L2 forwarding devices.

2. The apparatus of claim 1, wherein said determining the partitioning includes determining a spanning tree for a network comprising the first and said second L2 forwarding networks; and selecting the partitioning based on said determined spanning tree.

3. The apparatus of claim 2, wherein said determined the spanning tree includes calculating the spanning tree rooted a pseudo node attached to the first and said second L2 forwarding devices.

4. The apparatus of claim 1, wherein said determining the partitioning includes determining a spanning tree for at least one of said second L2 forwarding networks; and selecting the partitioning based on said determined spanning tree.

5. The apparatus of claim 1, wherein said determining the partitioning includes determining a spanning tree for each one of said second L2 forwarding networks; and selecting the partitioning based on said determined spanning trees of said second L2 forwarding networks.

6. The apparatus of claim 1, wherein each of said first and second L2 forwarding devices is a Rbridge (routing bridge).

7. The apparatus of claim 6, wherein a particular one of said second L2 forwarding devices is the elected Designated Rbridge (DR) for the broadcast link.

8. The apparatus of claim 6, wherein the first L2 forwarding device is the elected Designated Rbridge (DR) for the broadcast link and is configured to forward said some, but less than all, of the packets in contravention of its DR status.

9. The apparatus of claim 6, wherein each of said first and second L2 forwarding devices is a Rbridge that communicates topology information using Intermediate System to Intermediate System (IS-IS) protocol.

10. The apparatus of claim 1, wherein said first L2 forwarding device is configured to running spanning tree protocol for the first L2 forwarding network.

11. The apparatus of claim 1, wherein a particular one of said second L2 forwarding devices is the designated forwarding device for the broadcast link.

12. The apparatus of claim 1, wherein the first L2 forwarding device is the designated forwarding device for the broadcast link and is configured to forward said some, but less than all, of the packets in contravention of its designated forwarding device status.

13. The apparatus of claim 1, wherein a particular one of said one or more second L2 forwarding devices is a designated forwarding device (DFD); wherein the designated forwarding device is an L2 forwarding device selected to forward all packets transmitted to the broadcast segment other than by the particular one of said second L2 forwarding devices.

14. A method, comprising:
   employing a first layer 2 (L2) forwarding device of a first L2 forwarding network to perform operations; wherein the first layer 2 (L2) forwarding device is communicatively coupled to a broadcast link for receiving packets being sent to the first L2 forwarding network and one or more second L2 forwarding networks not having L2 forwarding adjacency for forwarding packets with the first L2 forwarding network; and wherein said operations include:

determining, by the first L2 forwarding device, a partition of some, but less than all, of the forwarding space of packets originated on the broadcast link by devices other than one or more second L2 forwarding devices of said second L2 forwarding networks; and forwarding, by the first L2 forwarding device according to said determined partition, some, but less than all, of said received packets that were originated on the broadcast link by devices other than said second L2 forwarding devices.

15. The method of claim 14, wherein said determining the partitioning includes determining a spanning tree for a network comprising the first and said one or more second L2 forwarding networks, with the spanning tree rooted at a pseudo node attached to the first and said one or more second L2 forwarding devices; and selecting the partitioning based on said determined spanning tree.

16. The method of claim 15, wherein a particular one of said one or more second L2 forwarding devices is a designated forwarding device (DFD); wherein the designated forwarding device is an L2 forwarding device selected to forward all packets transmitted to the broadcast segment other than by the particular one of said one or more second L2 forwarding devices.

17. The method of claim 14, wherein said determining the partitioning includes determining a spanning tree for each of one of said one or more second L2 forwarding networks; and selecting the partitioning based on said determined spanning tree for each of one of said one or more second L2 forwarding networks.

18. An apparatus, comprising:
a first layer 2 (L2) forwarding device of a first L2 forwarding network, wherein the first L2 forwarding device is configured for:
communicatively coupling to a broadcast link for receiving packets being sent to the first L2 forwarding network and one or more second L2 forwarding networks not having L2 forwarding adjacency for forwarding packets with the first L2 forwarding network;
means for determining, by the first L2 forwarding device, a partition of some, but less than all, of the forwarding space of packets originated on the broadcast link by devices other than one or more second L2 forwarding devices of said second L2 forwarding networks; and
means for forwarding, by the first L2 forwarding device according to said determined partition, some, but less than all, of said received packets that were originated on the broadcast link by devices other than said second L2 forwarding devices.

19. The apparatus of claim 18, wherein a particular one of said one or more second L2 forwarding devices is the elected Designated Rbridge (DR) for the broadcast link.

20. The apparatus of claim 18, wherein the first L2 forwarding device is the elected Designated Rbridge (DR) for the broadcast link configured to forward said some, but less than all, of the packets in contravention of its DR status.

21. One or more computer-storage media non-transitory encoded thereon with executable instructions for performing operations when said instructions are executed by one or more processing elements of a first layer 2 (L2) forwarding device of a first L2 forwarding network, with the first layer 2 (L2) forwarding device being communicatively coupled to a broadcast link for receiving packets being sent to the first L2 forwarding network and one or more second L2 forwarding networks not having L2 forwarding adjacency for forwarding packets with the first L2 forwarding network, with said operations comprising:
determining a partition of some, but less than all, of the forwarding space of packets originated on the broadcast link by devices other than one or more second L2 forwarding devices of said second L2 forwarding networks; and
causing to be forwarded according to said determined partition, some, but less than all, of said received packets that were originated on the broadcast link by devices other than said second L2 forwarding devices.

22. The computer-storage media of claim 21, wherein said determining the partitioning includes determining a spanning tree for a network comprising the first and said one or more second L2 forwarding networks, with the spanning tree rooted at a pseudo node attached to the first and said one or more second L2 forwarding devices; and selecting the partitioning based on said determined spanning tree.

23. The computer-storage media of claim 22, wherein a particular one of said one or more second L2 forwarding devices is a designated forwarding device (DFD); wherein the designated forwarding device is an L2 forwarding device selected to forward all packets transmitted to the broadcast segment other than by the particular one of said one or more second L2 forwarding devices.

24. The computer-storage media of claim 21, wherein said determining the partitioning includes determining a spanning tree for each of one of said one or more second L2 forwarding networks; and selecting the partitioning based on said determined spanning tree for each of one of said one or more second L2 forwarding networks.

* * * * *